(12) United States Patent
Nagaraj

(10) Patent No.: US 9,756,543 B2
(45) Date of Patent: Sep. 5, 2017

(54) APPLICATION-BASED RADIO-ACCESS TECHNOLOGY SWITCHING

(71) Applicant: Apple Inc., Cupertino, CA (US)

(72) Inventor: Suresh Nagaraj, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/783,098

(22) Filed: Mar. 1, 2013

(65) Prior Publication Data
US 2014/0247731 A1    Sep. 4, 2014

(51) Int. Cl.
*H04W 36/30* (2009.01)
*H04W 36/14* (2009.01)

(52) U.S. Cl.
CPC ............ *H04W 36/30* (2013.01); *H04W 36/14* (2013.01)

(58) Field of Classification Search
None
See application file for complete search history.

(56) References Cited

U.S. PATENT DOCUMENTS

| | | | |
|---|---|---|---|
| 7,215,962 B2 | 5/2007 | Faerber | |
| 8,238,920 B2 | 8/2012 | Zetterberg et al. | |
| 9,083,772 B2 * | 7/2015 | Lin | H04L 12/66 |
| 9,271,179 B2 * | 2/2016 | Singh | H04W 28/0215 |
| 9,521,598 B2 * | 12/2016 | Nie | H04W 36/0083 |
| 2005/0143071 A1 * | 6/2005 | Jaakkola | H04W 48/18 455/436 |
| 2007/0213055 A1 * | 9/2007 | Sundberg et al. | 455/436 |
| 2008/0014941 A1 * | 1/2008 | Catovic | H04W 36/30 455/436 |
| 2009/0042601 A1 * | 2/2009 | Wang et al. | 455/553.1 |
| 2011/0070897 A1 | 3/2011 | Tang et al. | |
| 2011/0237257 A1 * | 9/2011 | Soliman et al. | 455/436 |
| 2012/0135739 A1 | 5/2012 | Paterson | |
| 2012/0144063 A1 * | 6/2012 | Menchaca | H04L 47/2475 709/240 |
| 2013/0107860 A1 * | 5/2013 | Shi et al. | 370/331 |
| 2013/0128778 A1 * | 5/2013 | Bennett | H04W 36/08 370/277 |
| 2014/0128075 A1 * | 5/2014 | Da Silva et al. | 455/436 |
| 2014/0171064 A1 * | 6/2014 | Das | H04W 84/18 455/426.1 |
| 2014/0355522 A1 * | 12/2014 | Diab | H04W 88/06 370/328 |

* cited by examiner

*Primary Examiner* — Steve Young
(74) *Attorney, Agent, or Firm* — Downey Brand LLP

(57) ABSTRACT

A method for application-based radio access technology (RAT) switching is provided. The method can include engaging in data communication for the application over a connection to a first RAT and measuring a connection quality metric of the connection to the first RAT. The method can further include determining a threshold connection quality metric for an application. The threshold connection quality metric can be defined for the application and can be different from a second threshold connection quality metric defined for a second application. The method can also include comparing the measured connection quality metric to the threshold connection quality metric. The method can additionally include switching from the first RAT to a second RAT and engaging in data communication for the application over the second RAT in an instance in which the quality metric does not satisfy the threshold connection quality metric.

25 Claims, 7 Drawing Sheets

APPLICATION-BASED RADIO-ACCESS TECHNOLOGY SWITCHING

FIELD OF THE DESCRIBED EMBODIMENTS

The described embodiments relate generally to wireless communications and more particularly to application-based radio access technology (RAT) switching.

BACKGROUND

Many wireless communication devices are configured to access a network via multiple radio access technologies (RATs). For example, some devices, also known as dual-mode devices, can exchange data over both a wireless local area network (WLAN) and one or more cellular RATs. Such devices can accordingly switch between a WLAN and cellular connection depending on availability of a WLAN connection.

Some dual-mode devices are configured to default to connecting to a WLAN connection when available. In this regard, accessing and sending data over a WLAN is generally free and a WLAN connection often offers higher bandwidth than many cellular RATs. However, a connection quality of a WLAN connection can degrade to the point that it negatively impacts user experience if the device enters an area of relatively weak WLAN coverage. For example, a device can be connected to a WLAN access point in the user's house. The user can then walk outside of his or her house with his device, but can remain within sufficient proximity of the WLAN access point to maintain a connection to the WLAN. However, the connection quality of the WLAN connection can degrade due to increasing distance to the WLAN access point increases and obstructions such as walls being in the signal path. Degradation of the WLAN connection as the user enters a weak area of coverage outside of his or her house can result in an interruption in data transfer over the WLAN connection, which can lead to data stalls that can impact operation of applications exchanging data over the WLAN connection.

Data stalls occurring due to weak WLAN coverage can be extremely frustrating to a device user. However, many devices remain on a WLAN connection until a packet error rate (PER) experienced on the connection exceeds a threshold, which may not occur until a device has been in an area of weak coverage for a relatively substantial amount of time. In this regard, the radio interface of some devices can apply a universal PER threshold and can switch from a WLAN connection to a cellular RAT when the PER on the WLAN connection exceeds the PER. However, application of a universal PER threshold does not provide for a consistently good user experience, as the threshold at which user experience can suffer due to degrading connection quality can vary depending on an activity being performed on the device. For example, a user watching a video may be negatively impacted by a loss of signal quality on a connection more quickly than a user checking email.

SUMMARY OF THE DESCRIBED EMBODIMENTS

Some embodiments disclosed herein provide for application-based RAT switching. In this regard, some example embodiments provide a wireless communication device configured to apply application-specific threshold connection quality metrics. Accordingly, in such example embodiments, threshold connection quality metrics can be tailored on an application-by-application basis to enhance user experience by providing for switching between RATs more quickly as coverage degrades. Thus, for example, RAT switching can be performed more quickly for applications that can be more sensitive to a loss in signal quality through application of application-specific connection quality metrics.

The above summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Representative applications of systems, methods, apparatuses, and computer program products according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some example embodiments address the problem of data stalls occurring due to a wireless communication device being within an area of weak coverage by a serving RAT. In this regard, the serving RAT signal can be strong enough that a wireless communication device can remain on the serving RAT, such as due to a general preference for using the serving RAT when available. However, a quality of the connection can be such that a data stall can occur when an application operating on the device attempts to engage in data communication over the RAT. Traditionally, devices have relied on a single, universal connection quality metric, such as an experienced PER for governing RAT switching. However, usage of a single, universal metric can result in a device remaining on a serving RAT until after a device has been in an area of weak coverage for a relatively substantial amount of time.

Rather than relying on a single, universal connection quality metric that may not be appropriate for all applications, some example embodiments disclosed herein provide for application-based RAT switching in which application-specific threshold connection quality metrics can be applied. Thus, a threshold can be defined for a given application based on a threshold at which user experience can suffer due to degrading connection quality. Thus, for example, application-specific threshold connection quality metrics can be defined so that RAT switching can be performed more quickly for applications that can be more sensitive to a loss in signal quality through use of application-specific connection quality metrics.

Figure 1:
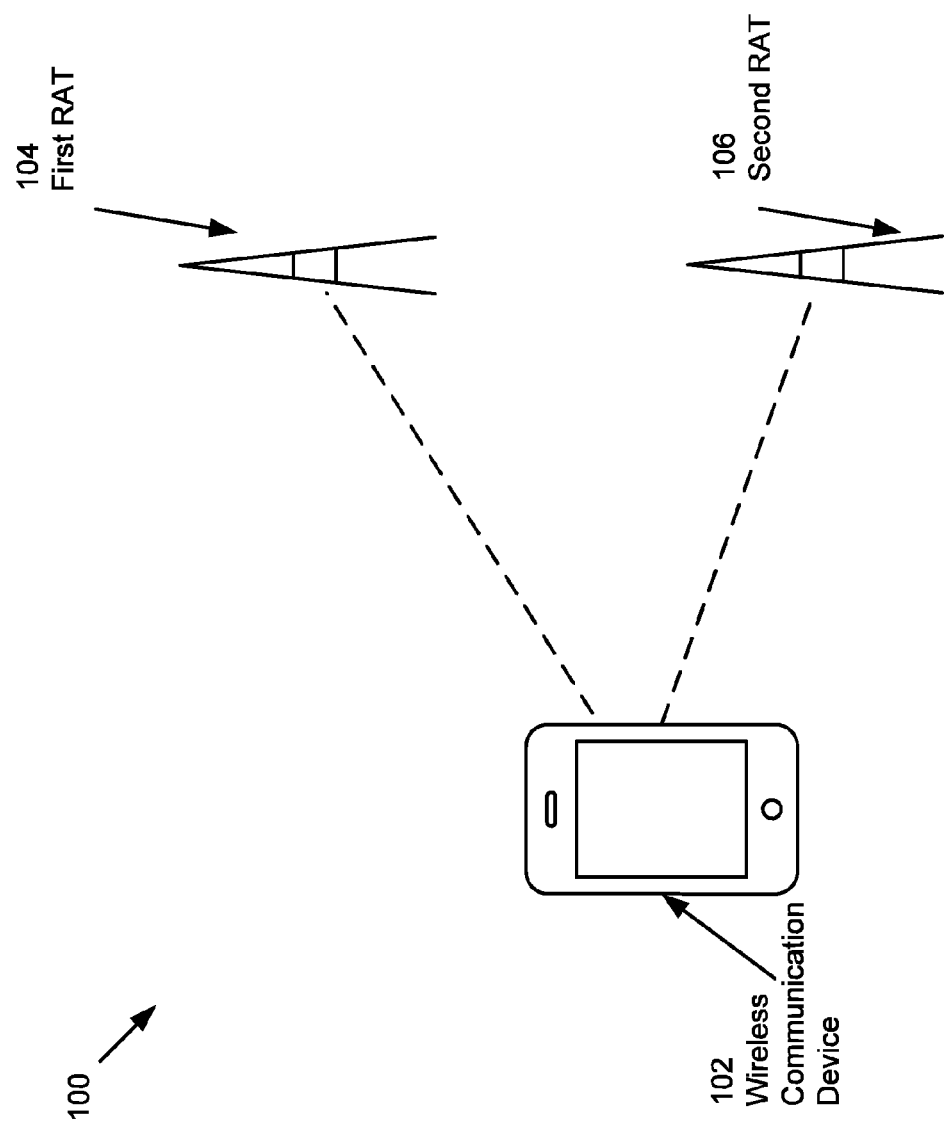
FIG. 1 illustrates a system in accordance with some example embodiments.

FIG. 1 illustrates a system 100 in accordance with some example embodiments. The system 100 can include a wireless communication device 102. The wireless communication device 102 can be a cellular phone, such as a smart phone device, a tablet computing device, a laptop computing device, or other computing device configured to connect to wirelessly obtain network access via two or more RATs.

In the example system illustrated in FIG. 1, the wireless communication device 102 can be within range of network access points for two or more RATs, including a first RAT 104 and a second RAT 106. The first RAT 104 and second RAT 106 can each implement any respective RAT. However, the RAT implemented by the second RAT 106 can be different form the RAT implemented by the first RAT 104. In some example embodiments, one or both of the first RAT 104 and second RAT 106 can implement a cellular RAT. In embodiments including a cellular RAT(s), the cellular RAT can, for example, be a Long Term Evolution (LTE) RAT, LTE-Advanced RAT, a Universal Mobile Telecommunications System (UMTS) RAT (e.g., a Wideband Code Division Multiple Access (WCDMA), a Time Division Synchronous Code Division Multiple Access (TD-SCDMA) network, and/or other UMTS RAT), a CDMA2000 RAT, a 1×RTT RAT, Global System for Mobile Communications (GSM), and/or other cellular RAT.

In some example embodiments, one of the first RAT 104 or the second RAT 106 can be a WLAN RAT. In embodiments including a WLAN RAT(s), a respective WLAN RAT can, for example, use an Institute of Electrical and Electronics Engineers (IEEE) 802.11x RAT, including but not limited to 802.11a, 802.11b, 802.11g, 802.11n, 802.11ac, and/or other present or future developed 802.11x RAT.

In some example embodiments, the first RAT 104 can be a WLAN RAT and the second RAT 106 can be a cellular RAT. As another example, the first RAT 104 can implement a cellular RAT and the second RAT 106 can implement a WLAN RAT. However, it will be appreciated, that in some instances both the first RAT 104 and second RAT 106 can implement respective cellular RATs. Further, it will be appreciated that implementations in which one or more of the first RAT 104 or second RAT 106 can implement a RAT other than a cellular RAT or WLAN RAT are contemplated within the scope of the disclosure.

As will be further described below, the wireless communication device 102 can have a connection to the first RAT 104 and can engage in data communication for the first RAT 104 for an application. In accordance with some example embodiments, as will be described further herein below, the wireless communication device 102 can switch from the first RAT 104 to the second RAT 106 in an instance in which a measured connection quality metric of the connection to the first RAT 104 fails to satisfy a threshold connection quality metric defined for the application for which data communication is performed over the connection to the first RAT 104.

In some instances, when switching to the second RAT 106, the wireless communication devices 102 can terminate its connection to the first RAT 104. Alternatively, in other instances when switching to the second RAT 106, the wireless communication device 102 can maintain its connection to the first RAT 104. However, the wireless communication device 102 can switch to sending data for an application via the second RAT 106, rather than via the first RAT 104. In this regard, the wireless communication device 102 can switch a current active data interface that can be used for an application from the first RAT 104 to the second RAT 106.

Figure 2:
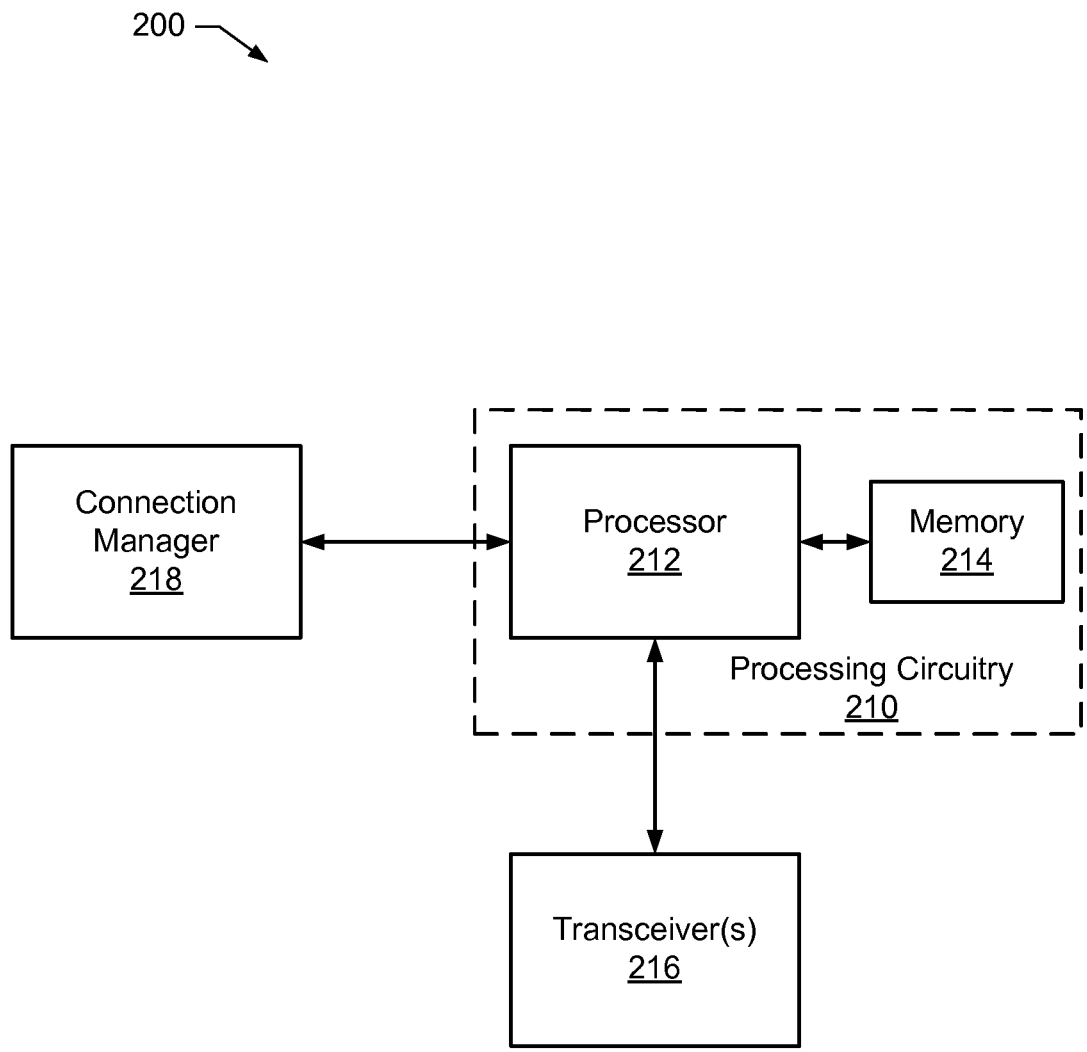
FIG. 2 illustrates a block diagram of an apparatus that can be implemented on a wireless communication device in accordance with some example embodiments.

FIG. 2 illustrates a block diagram of an apparatus 200 that can be implemented on a wireless communication device 102 in accordance with some example embodiments. In this regard, when implemented on a computing device, such as wireless communication device 102, apparatus 200 can enable the computing device to operate within the system 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the apparatus 200 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset including one or more chips. In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a chipset configured to enable a computing device to operate on a cellular network, WLAN, and/or other RAT.

In some example embodiments, the processing circuitry 210 can include a processor 212 and, in some embodiments, such as that illustrated in FIG. 2, can further include memory 214. The processing circuitry 210 can be in communication with or otherwise control the transceiver(s) 216, and/or the connection manager 218.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 can provide hardware capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, transceiver(s) 216, or connection manager 218 via a bus(es) for passing information among components of the apparatus 200.

The apparatus 200 can further include a transceiver(s) 216. The transceiver(s) 216 can enable the apparatus 200 to send wireless signals to and receive signals from one or more wireless networks using two or more RATs, such as the first RAT 104 and the second RAT 106. As such, the transceiver(s) 216 can be configured to support any type of RAT that may be implemented by the first RAT 104 and the second RAT 106. In some example embodiments, the transceiver(s) 216 can include a single transceiver configured to enable the wireless communication device 102 to establish connections to both the first RAT 104 and the second RAT 106. Alternatively, in some example embodiments, the transceiver(s) 216 can include a first transceiver configured to enable the wireless communication device 102 to connect to the first RAT 104 and a second transceiver configured to enable the wireless communication device 102 to connect to the second RAT 106.

The apparatus 200 can further include connection manager 218. The connection manager 218 can be embodied as various means, such as circuitry, hardware, a computer program product comprising computer readable program instructions stored on a computer readable medium (for example, the memory 214) and executed by a processing device (for example, the processor 212), or some combination thereof. In some embodiments, the processor 212 (or the processing circuitry 210) can include, or otherwise control the connection manager 218.

The connection manager 218 of some example embodiments can be configured to enforce application-specific threshold connection quality metrics. In this regard, the connection manager 218 can be configured to instruct a lower layer radio interface to switch from the first RAT 104 to the second RAT 106 in an instance in which a measured connection quality metric of the connection to the first RAT 104 does not satisfy the threshold connection quality metric for an application which is engaging in data communication over the connection to the first RAT 104. In some instances, a radio connection to the first RAT 104 can be maintained after switching to the second RAT 106, but an active data interface used for an application can be switched to the second RAT 106 so that traffic for the application is communicated via the second RAT 106.

Figure 3:
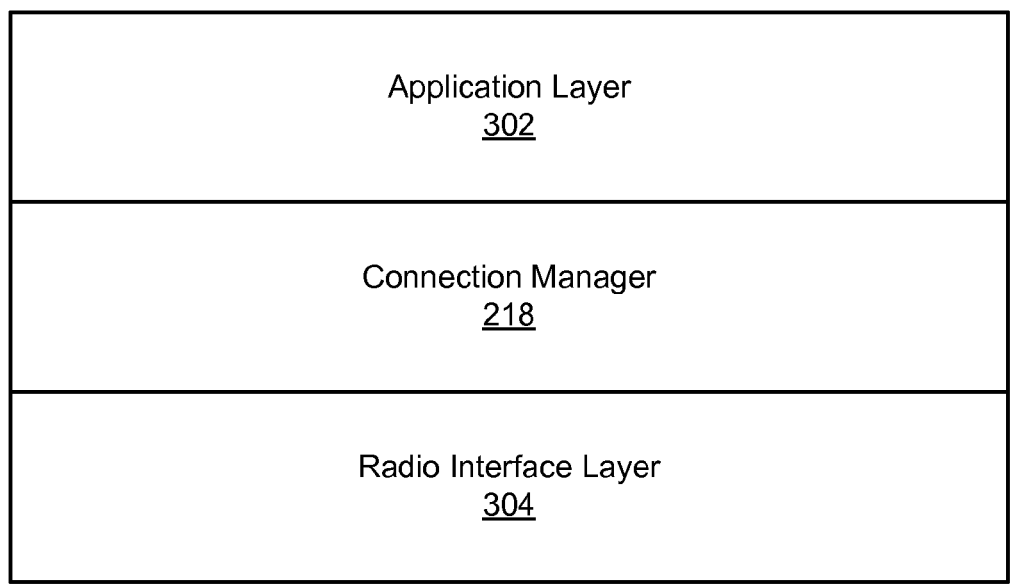
FIG. 3 illustrates a system layer diagram including a connection manager in accordance with some example embodiments.

FIG. 3 illustrates a system layer diagram 300 including a connection manager 218, such as can be implemented on the wireless communication device 102, in accordance with some example embodiments. As illustrated, in the system layer diagram 300, the system can include an application layer 302, which can include any application that can be implemented on the wireless communication device 102, and for which data can be sent and/or received over a network connection. By way of non-limiting example, an application which can be implemented on the application layer can include an email application, web browsing application, media player, a game, and/or other application for which data can be sent and/or received over a network connection for supporting operation of the application.

The system layer diagram 300 can further include a radio interface layer 304. The radio interface layer 304 can include software, firmware, hardware, or some combination thereof that can be configured to control operation of one or more network interfaces, such as the transceiver(s) 216, which can be implemented on the wireless communication device 102. In this regard, the radio interface layer 304 can be configured to perform operations to establish network connections and manage data transfer over a network interface. The radio interface layer 304 can be further configured to measure connection quality metrics for an active network connection. Thus, for example, when connected to the first RAT 104, the radio interface layer 304 can measure connection quality metrics, such as packet error rate, latency, jitter, throughput, transmission timeouts, and/or the like based at least in part on data communication over the connection.

The connection manager 218 can be configured to interface between the application layer 302 and radio interface layer 304 to enforce threshold connection quality metrics for active applications. In this regard, the connection manager 218 can be configured access measured connection quality metrics for an active connection, such as a connection to the first RAT 104, which can be measured by the radio interface layer 304. The connection manager 218 can be further configured to interface with the application layer 302 such that the connection manager 218 can have knowledge of an active application and, in some example embodiments, can know an activity being performed by an active application.

In some example embodiments, the connection manager 218 can have access to one or more application-specific threshold connection quality metrics. For example, the connection manager 218 can be provisioned with one or more predefined application-specific threshold connection quality metrics. Additionally or alternatively, an application can provide the connection manager 218 with a threshold connection quality metric to enforce when the application is active. In such embodiments, the connection manager 218 can determine whether a connection quality metric that can be measured by the radio interface layer 304 satisfies a threshold connection quality metric for an active application. If the measured threshold connection quality metric does not satisfy the threshold connection quality metric, the connection manager 218 of some example embodiments can be configured to instruct a lower layer, such as the radio interface layer 304, to switch RATs, such as from the first RAT 104 to the second RAT 106.

Additionally or alternatively, in some example embodiments, an active application can define and enforce its own threshold connection quality metric(s). In some such example embodiments, the application layer 302 can access a measured connection quality metric from the radio interface layer 304. Alternatively, in some such example embodiments, the connection manager 218 can serve as an intermediary between the application layer 302 and the radio interface layer 304, and can provide the application layer 302 with access to a connection quality metric that can be measured by the radio interface layer 304. In embodiments in which an active application can define and enforce its own threshold connection quality metric(s), the active application can compare its threshold connection quality metric(s) to a connection quality metric that can be measured by the radio interface layer 304. If the measured connection quality metric does not satisfy a threshold connection quality metric, the application layer 302 can instruct the connection manager 218 to switch RATs. The connection manager 218 can be configured, in turn, to instruct a lower layer, such as the radio interface layer 304, to switch RATs, such as from the first RAT 104 to the second RAT 106.

From the illustration of FIG. 3, it can be seen that, in some example embodiments, intelligence for switching RATs based on measured connection quality metrics can be implemented at upper layers rather than relying on the radio interface layer 304 to determine when to switch RATs. Accordingly, a decision to switch RATs can be made at a higher layer based on the needs of and conditions experienced by an application operating in the application layer 302.

Figure 4:
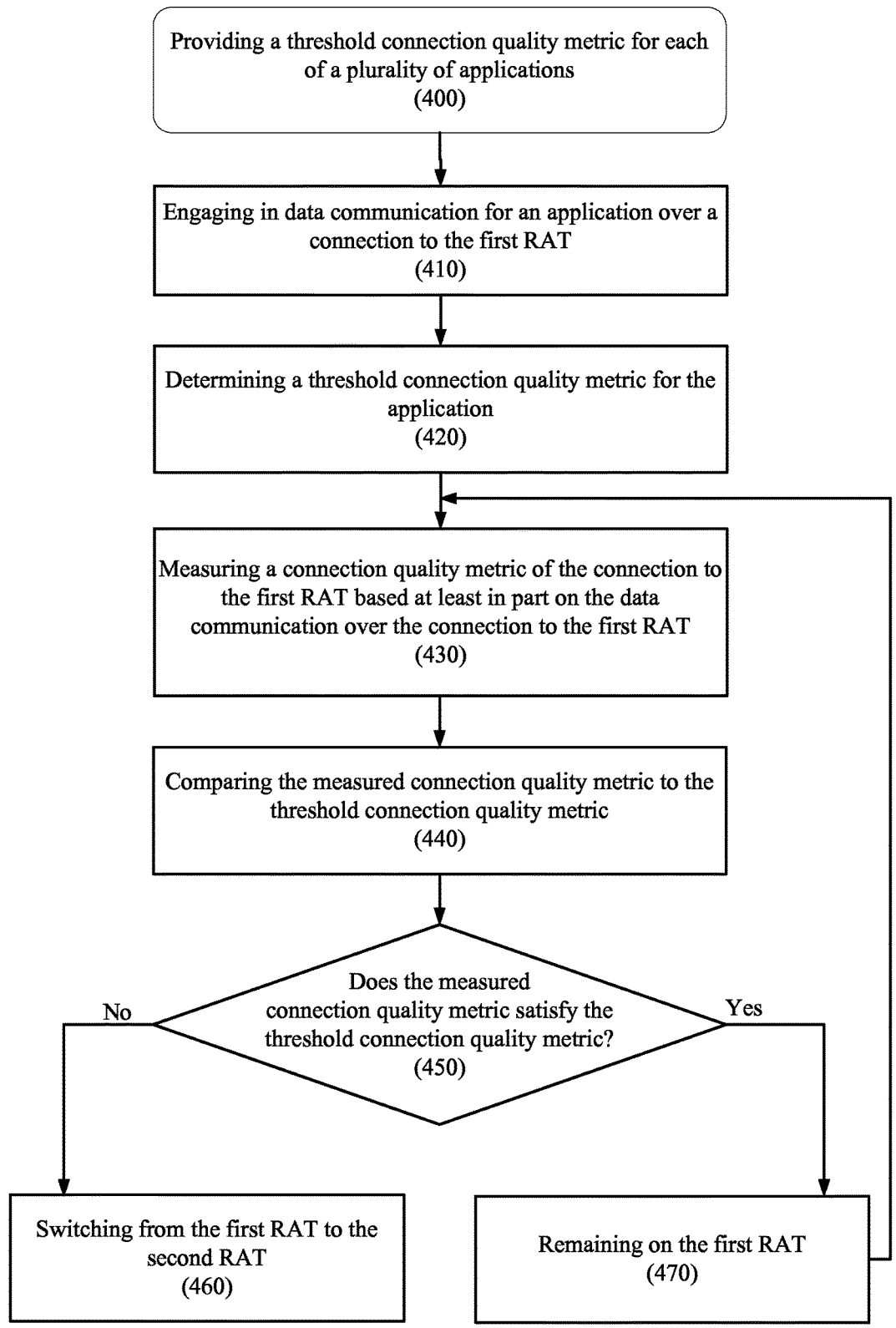
FIG. 4 illustrates a flowchart according to an example method for application-based RAT switching according to some example embodiments.

FIG. 4 illustrates a flowchart according to an example method for application-based RAT switching according to some example embodiments. One or more of processing circuitry 210, processor 212, memory 214, transceiver(s) 216, or connection manager 218 can, for example, provide means for performing the operations illustrated in and described with respect to FIG. 4. As an initial configuration, as illustrated by operation 400, a threshold connection quality metric can be provided for each of a plurality of applications. Each respective threshold connection quality metric can, for example, define one or more of a threshold throughput, threshold timeout value, threshold latency, threshold packet error rate, threshold jitter value, or some other connection quality that can be measured based at least in part on data communication over a connection.

In some example embodiments, a threshold connection quality metric can define a number of packets that are to be sent for an application prior to measurement of a connection quality metric and enforcement of the threshold connection quality metric on the basis of the measured connection quality metric. For example, a threshold connection quality metric can define a threshold packet error rate and an associated threshold number of packets that are sent for the application prior to calculation of a packet error rate and enforcement of the threshold packet error rate. Defining a number of packets to be sent prior to calculation and enforcement of a threshold connection quality metric can enable adjustment of a threshold connection quality metric to the sensitivities of a particular application. For example, a connection quality metric can be measured after fewer packets have been exchanged for an application, such as email, for which the packet volume may be lower than for an application such as a media player for which the packet volume may be higher. In this regard, the point at which a user is impacted by latency can vary by application, as an email application can be more sensitive than a media player application due to its lower packet volume. Accordingly, the wireless communication device 102 can remain on a RAT with degrading connection quality longer for an application with lower packet volume than for an application with higher packet volume if a common threshold number of packets is applied to both before measuring a connection quality metric of the serving RAT. Thus, for example, a connection quality metric may be measured for an email application based on 50 sent packets, whereas a connection quality metric may be measured for a media player application based on 100 sent packets so that, if the connection quality degrades, a RAT switch can be performed more quickly for the email application.

In some example embodiments, a threshold connection quality metric used for an application can be defined based at least in part on a cost to send data over the second RAT 106. For example, in an instance in which the second RAT 106 is a cellular RAT, the cost can be a combination of what it costs in user experience to switch to and use the cellular RAT as well as any applicable data cap and/or data cost on cellular link. In this regard, it may be desirable to stay on a Wi-Fi connection as long as possible with some applications rather than switching to a cellular RAT. Thus, for example, for lower priority applications and/or for lower priority data activities, threshold connection quality metrics can be defined that maintain a connection to a serving RAT with a more degraded connection quality than for a higher priority application. As a more particular example, for an active application receiving push notifications, such as from news websites, on a serving Wi-Fi RAT, it can be more desirable to remain on the serving Wi-Fi RAT than to switch to a cellular RAT than for an email application. As such, a threshold connection quality metric requiring a higher connection quality can be defined for a higher priority application than for a lower priority application so that a connection is not switched to a connection with a data cap or other data costs unless a priority of the application justifies the costs of switching to and engaging in data communications over the second RAT 106.

Returning to the operations of FIG. 4, operation 410 can include engaging in data communication for an application over the first RAT 104. Operation 420 can include determining a threshold connection quality metric for the application. In this regard, the connection manager 218 or other higher layer, such as the application layer 302 can determine the threshold connection quality metric to be enforced for the active application from among the plurality of provided threshold connection quality metrics. The determined threshold connection quality metric can, for example, have a predefined association with the application. Additionally or alternatively, the determined threshold connection quality metric can be a threshold connection quality metric defined or otherwise provided by the active application. Operation 430 can include measuring a connection quality metric of the connection to the first RAT 104 based at least in part on the data communication over the connection to the first RAT 104. In an embodiment in which the threshold connection quality metric defines a threshold number of packets to be sent for the application prior to measurement of the connection quality metric, operation 430 can be performed after the threshold number of packets have been sent. Operation 430 can be performed by the radio interface layer 304 or other lower layer, which can make the measured connection quality metric available to the connection manager 218 and/or to the application layer 302. Operation 440 can include comparing the measured connection quality metric to the applicable threshold connection quality metric determined in operation 420. Operation 450 can include determining whether the measured connection quality metric satisfies the threshold connection quality metric based on the comparison of operation 440.

In an instance in which it is determined at operation 450 that the measured connection quality metric does not satisfy the threshold connection quality metric, the method can proceed to operation 460, which can include switching from the first RAT 104 to the second RAT 106. In this regard, operation 460 can include the connection manager 218 instructing the radio interface layer 304 and/or other lower layer to switch from the first RAT 104 to the second RAT 106 and the radio interface layer 304 can, in turn switch from the first RAT 104 to the second RAT 106.

If, however, it is determined at operation 450 that the measured connection quality metric satisfies the threshold connection quality metric, the method can instead proceed to operation 470, which can include remaining on the first RAT 104. In some embodiments, the method can return to operation 430 such that the connection quality can be measured and compared to the threshold connection quality metric on an ongoing basis.

In some example embodiments, multiple threshold connection quality metrics can be defined for a particular application. In such embodiments, each threshold connection quality metric defined for a particular application can be defined for a particular activity that can be performed by the application such that multiple activity-specific threshold connection quality metrics can be defined for an application. In this regard, the sensitivity of an application and/or user thereof to a degrading connection quality can vary depending on the particular activity. Further, some activities can have a higher priority than others.

As an example, a web browsing application can be used for general web browsing and viewing video among other activities. A first threshold connection quality metric can be defined for use when the web browsing application is exchanging data for general web browsing, while a second threshold connection quality metric can be defined for use when the web browsing application is exchanging data in support of a streaming video being viewed within the web browsing application.

As another example, different threshold connection quality metrics can be defined for different activities that can be performed by an email application, such as sending an email, a user actively trying to refresh the email inbox, refreshing the email inbox on a scheduled basis, downloading email content, downloading an attachment, and the like. Downloading an email can, for example, have a lower priority than refreshing the email inbox, and can have an associated threshold connection quality metric that is more tolerant of a degraded connection quality than a threshold connection quality metric that can be associated with refreshing the email inbox. As a further example, refreshing the email inbox to display email subject lines can be prioritized more highly than downloading an attachment or downloading the full email content, and thus can have an associated threshold connection quality metric that is less tolerant of a degraded connection quality than a threshold connection quality metric that can be associated with downloading an attachment or downloading the full content of an email.

In some example embodiments in which multiple threshold connection quality metrics can be defined for a given application, the connection manager 218 can be configured to determine an activity being performed by the application and/or a priority thereof so that the connection manager 218 can apply an appropriate threshold connection quality metric. In such example embodiments, the connection manager 218 can monitor application activities and/or can communicate with the application layer 302 to ascertain an activity being performed by an application. In some example embodiments in which multiple threshold connection quality metrics can be defined for a given application the application can be configured to actively indicate to the connection manager 218 an activity and/or a priority of an activity being performed so that the connection manager 218 can select an appropriate threshold connection quality metric. For example, if an email application is attempting to send an email flagged as high priority, the application can indicate to the connection manager 218 that it is performing a high priority activity and that a less tolerant threshold connection quality metric should be applied so that the wireless communication device 102 can be more aggressive in switching RATs if faced with a degraded connection quality.

Figure 5:
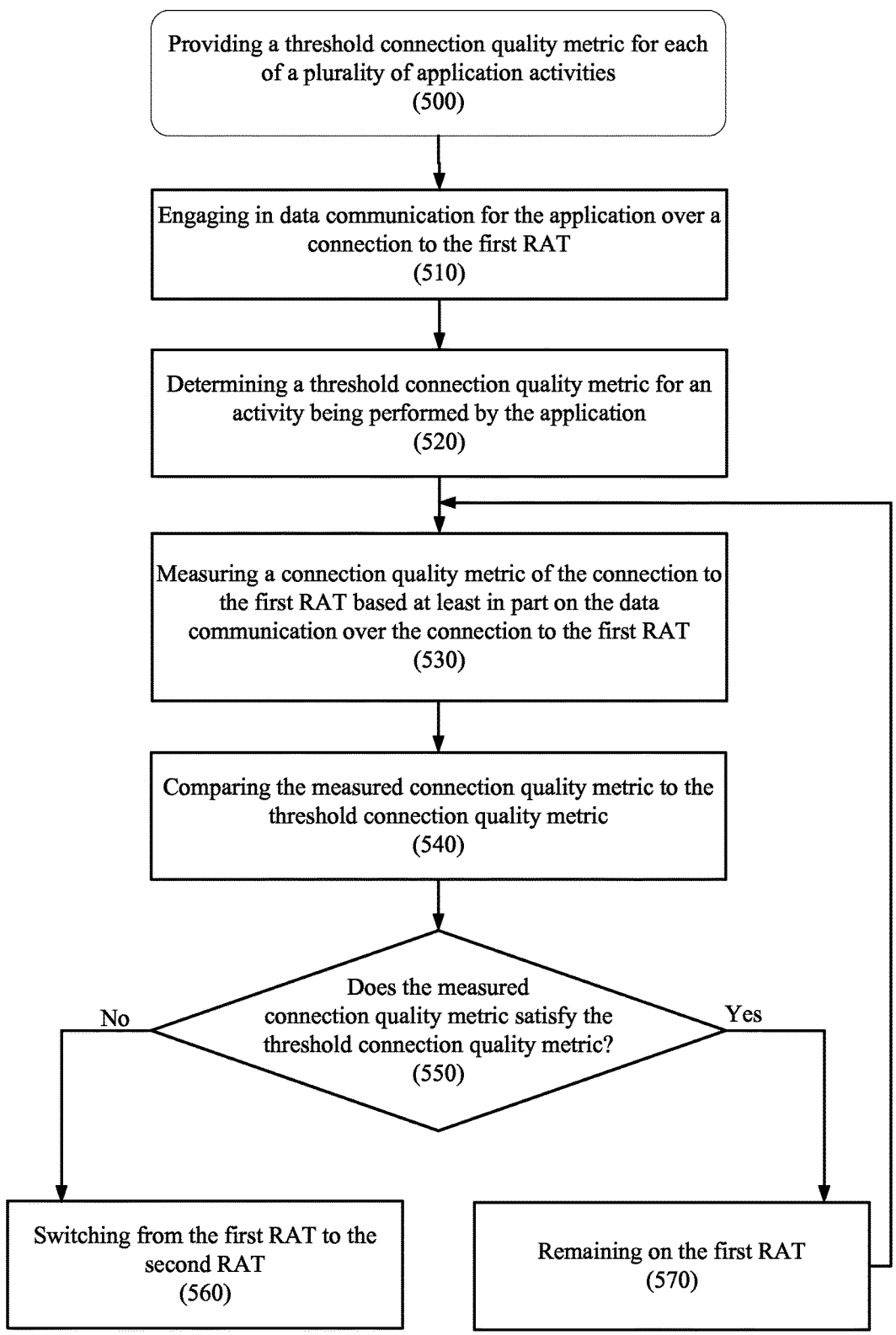
FIG. 5 illustrates a flowchart according to another example method for application-based RAT switching according to some example embodiments.

FIG. 5 illustrates a flowchart according to an example method for application-based RAT switching in which multiple threshold connection quality metrics are defined for a given application according to some example embodiments. One or more of processing circuitry 210, processor 212, memory 214, transceiver(s) 216, or connection manager 218 can, for example, provide means for performing the operations illustrated in and described with respect to FIG. 5. As an initial configuration, as illustrated by operation 500, a threshold connection quality metric can be provided for each of a plurality of application activities for a given application. Operation 510 can include engaging in data communication for an application over the first RAT 104. Operation 520 can include determining a threshold connection quality metric for an activity being performed by the application. In this regard, the connection manager 218 or other higher layer, such as the application layer 302 can determine the threshold connection quality metric to be enforced for the activity being performed for the active application from among the plurality of provided threshold connection quality metrics for the active application. The determined threshold connection quality metric can, for example, have a predefined association with the activity being performed by application.

Operation 530 can include measuring a connection quality metric of the connection to the first RAT 104 based at least in part on the data communication over the connection to the first RAT 104. In an embodiment in which the threshold connection quality metric defines a threshold number of packets to be sent for the application prior to measurement of the connection quality metric, operation 530 can be performed after the threshold number of packets have been sent. Operation 530 can be performed by the radio interface layer 304 or other lower layer, which can make the measured connection quality metric available to the connection manager 218 and/or to the application layer 302. Operation 540 can include comparing the measured connection quality metric to the applicable threshold connection quality metric determined in operation 520. Operation 550 can include determining whether the measured connection quality metric satisfies the threshold connection quality metric based on the comparison of operation 540.

In an instance in which it is determined at operation 550 that the measured connection quality metric does not satisfy the threshold connection quality metric, the method can proceed to operation 560, which can include switching from the first RAT 104 to the second RAT 106. In this regard, operation 560 can include the connection manager 218 instructing the radio interface layer 304 and/or other lower layer to switch from the first RAT 104 to the second RAT 106 and the radio interface layer 304 can, in turn switch from the first RAT 104 to the second RAT 106.

If, however, it is determined at operation 550 that the measured connection quality metric satisfies the threshold connection quality metric, the method can instead proceed to operation 570, which can include remaining on the first RAT 104. In some embodiments, the method can return to operation 530 such that the connection quality can be measured and compared to the threshold connection quality metric on an ongoing basis.

In some example embodiments, one or more activities for an application can be prioritized more highly such that a threshold connection metric for a prioritized activity can allow for switching to the second RAT 106 more readily for a duration of the activity in the event of a measured connection quality metric for the first RAT 104 failing to satisfy the threshold connection quality metric for the activity. However, after the activity has been completed, the connection manager 218 can switch back to the first RAT 104 for any other data activities that may be performed by the application and/or by other applications. In this regard, such embodiments can provide a loan based system where the second RAT 106 can be used for a duration of the activity.

Figure 6:
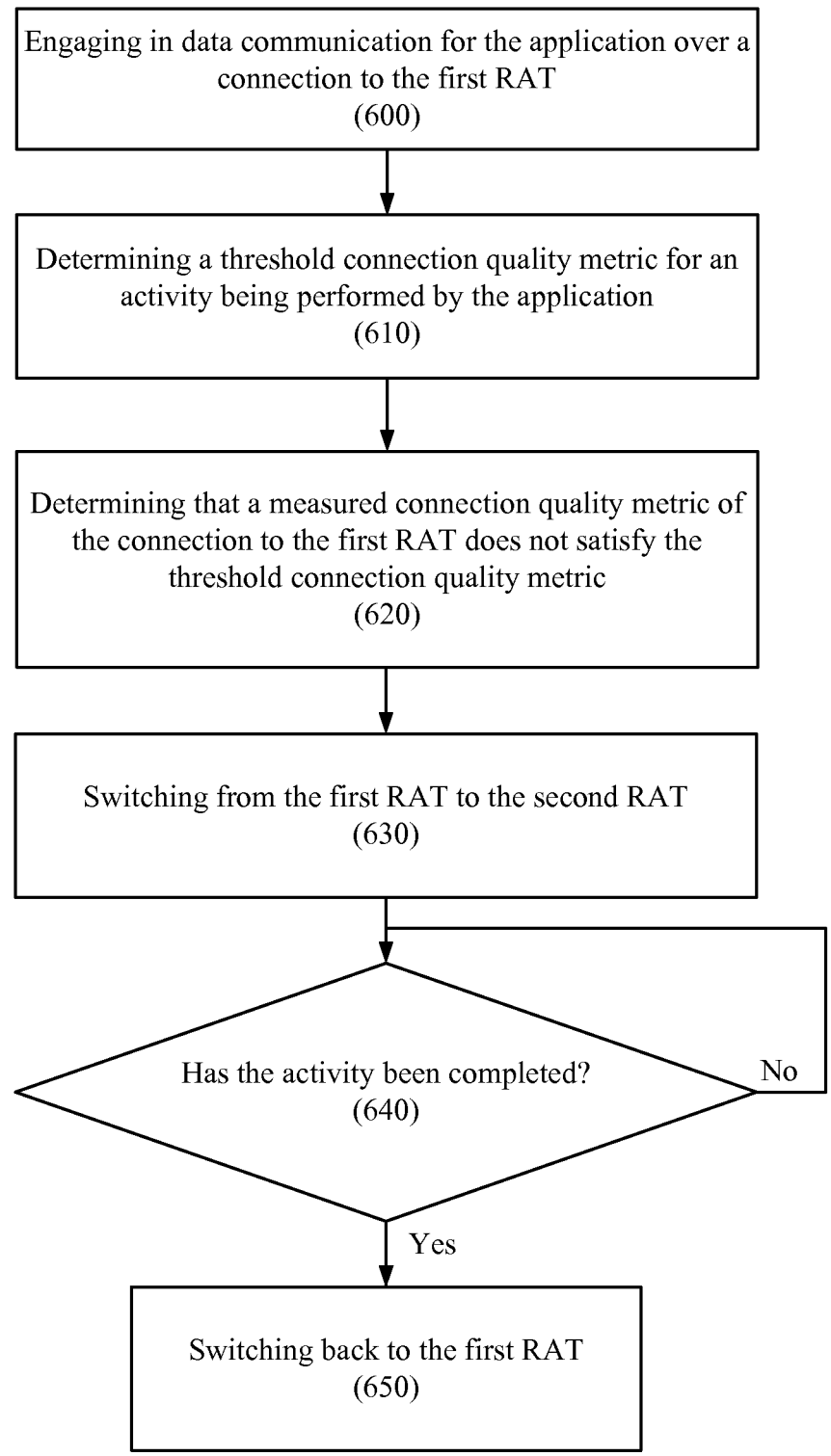
FIG. 6 illustrates a flowchart according to an example method for application-based RAT switching for a duration of an activity according to some example embodiments.

FIG. 6 illustrates a flowchart according to an example method for application-based RAT switching for a duration of an activity according to some example embodiments. One or more of processing circuitry 210, processor 212, memory 214, transceiver(s) 216, or connection manager 218 can, for example, provide means for performing the operations illustrated in and described with respect to FIG. 6. Operation 600 can include engaging in data communication for an application over the first RAT 104. Operation 610 can include determining a threshold connection quality metric for an activity being performed by the application. Operation 620 can include determining that a measured connection quality metric of the connection to the first RAT 104 does not satisfy the threshold connection quality metric. Operation 630 can include switching from the first RAT 104 to the second RAT 106 in response to the determination of operation 620. In some instances, the wireless communication device 102 may not dissociate from the first RAT 104, but can switch the active data interface for the application to the second RAT 106. The wireless communication device 102 can use the second RAT 106 for data communication for the application for a duration of the activity. After it is determined in operation 640 that the activity has been completed, the wireless communication device 102 can switch back to the first RAT 104, in operation 650.

In some example embodiments, the connection manager 218 can be configured to not switch RATs if a measured connection quality has failed to satisfy a threshold connection quality metric due to a remote server being down. For example, if data transmission has timed out due to a remote server with which the wireless communication device 102 can be attempting to communicate being down, the connection manager 218 can opt to remain on the serving RAT (e.g., the first RAT 104 without switching to another RAT (e.g., the second RAT 106) because switching RATs may not provide any benefit if the remote server is down.

It will be appreciated that embodiments disclosed herein are not limited to use of application specific and/or application activity specific thresholds for switching between different RATs. In this regard, various example embodiments can be applied to switching between any two access networks, including access networks using a common RAT in response to a measured connection quality metric failing to satisfy a threshold connection quality metric. By way of non-limiting example, if a connection quality of a first WLAN does not satisfy a threshold for an application and/or application activity, the wireless communication device 102 can switch to a second WLAN, if another WLAN connection is available.

Figure 7:
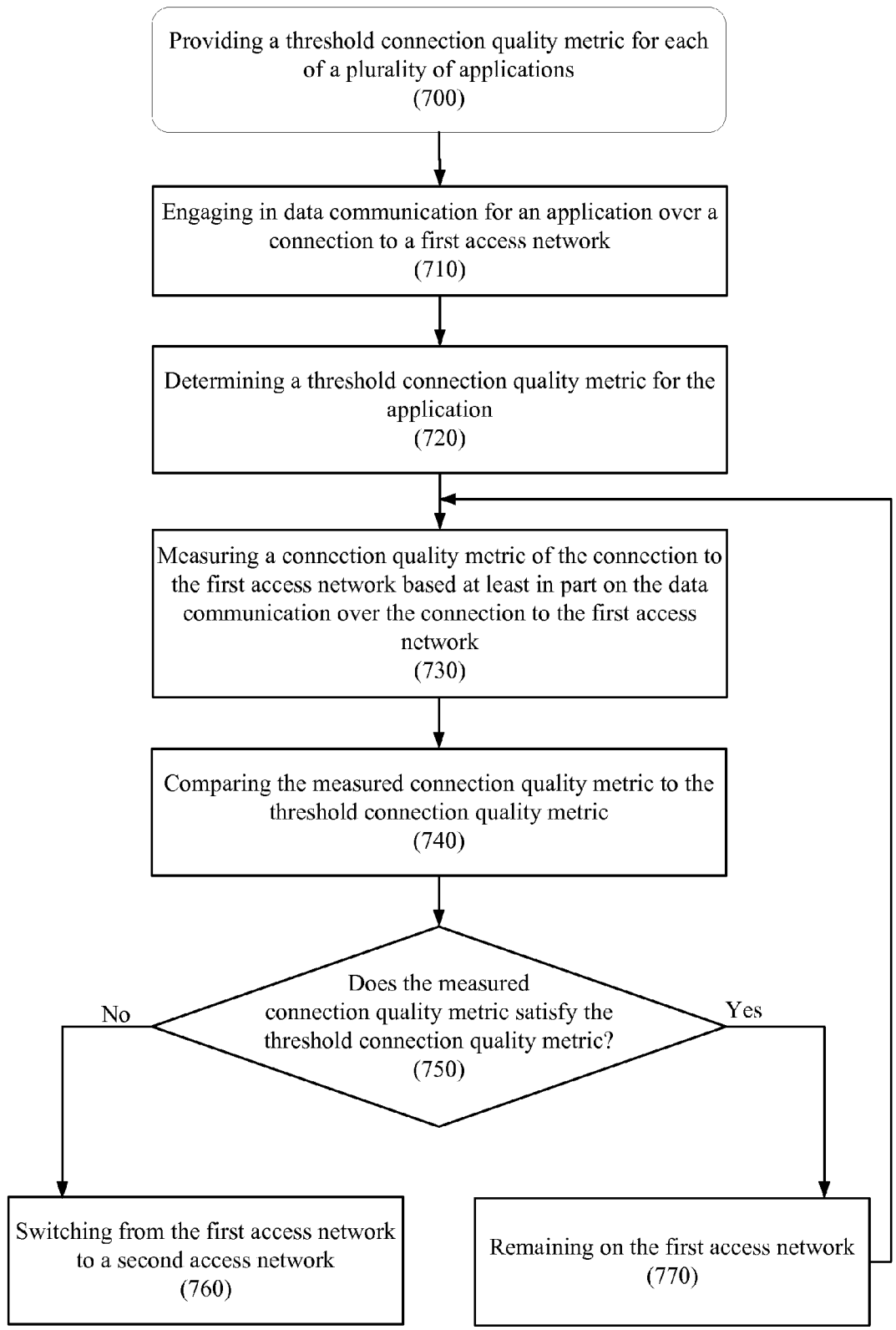
FIG. 7 illustrates a flowchart according to an example method for application-based access network switching according to some example embodiments.

FIG. 7 illustrates a flowchart according to an example method for application-based access network switching according to some example embodiments. One or more of processing circuitry 210, processor 212, memory 214, transceiver(s) 216, or connection manager 218 can, for example, provide means for performing the operations illustrated in and described with respect to FIG. 7. As an initial configuration, as illustrated by operation 700, a threshold connection quality metric can be provided for each of a plurality of applications. Operation 710 can include engaging in data communication for an application over a first access network. Operation 720 can include determining a threshold connection quality metric for the application. Operation 730 can include measuring a connection quality metric of the connection to the first access network based at least in part on the data communication over the connection to the first access network. Operation 740 can include comparing the measured connection quality metric to the applicable threshold connection quality metric determined in operation 720. Operation 750 can include determining whether the measured connection quality metric satisfies the threshold connection quality metric based on the comparison of operation 740.

In an instance in which it is determined at operation 750 that the measured connection quality metric does not satisfy the threshold connection quality metric, the method can proceed to operation 760, which can include switching from the first access network to a second access network. If, however, it is determined at operation 750 that the measured connection quality metric satisfies the threshold connection quality metric, the method can instead proceed to operation 770, which can include remaining on the first access network. In some embodiments, the method can return to operation 730 such that the connection quality can be measured and compared to the threshold connection quality metric on an ongoing basis.

In some example embodiments, if the wireless communication device 102 switches RATs, such as from the first RAT 104 to the second RAT 106 based on an application-specific threshold, the connection manager 218 can be configured to look for an alternative access network using the first RAT and connect to the alternative access network when found. Thus, for example, in some embodiments, the wireless communication device 102 can switch from a first WLAN to a cellular network based on an application-specific threshold. After switching to the cellular network, the wireless communication device 102 of such embodiments can look for a second WLAN having a better signal quality than the first WLAN and can switch to the second WLAN.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for application-based radio access technology (RAT) switching performed at a wireless communication device configurable to connect wirelessly using a plurality of RATs to one or more wireless networks, the method comprising the wireless communication device:

engaging in data communication for an application over a first connection using a first RAT, wherein the first RAT is a wireless local area network (WLAN) RAT;

obtaining, from an application layer by a connection manager between the application layer and a radio interface layer, indications of: (i) the application, (ii) an activity being performed by the application, the activity being one of a plurality of activities for the application, and (iii) a priority for the activity;

determining, by the connection manager, a threshold connection quality metric for the application, the threshold connection quality metric being based at least in part on the activity being performed by the application and on the priority for the activity, wherein each of the plurality of activities for the application is associated with a distinct threshold connection quality metric, and threshold connection quality metrics for activities having higher priorities cause switching between RATs more readily than threshold connection quality metrics for activities having lower priorities;

measuring a connection quality metric of the first connection using the first RAT based at least in part on the data communication for the application over the first connection using the first RAT;

comparing the measured connection quality metric to the threshold connection quality metric; and in an instance in which the measured connection quality metric does not satisfy the threshold connection quality metric:

switching the data communication for the application from the first connection using the first RAT to a second connection using a second RAT, wherein the second RAT is a cellular RAT; and continuing the data communication for the application over the second connection using the second RAT, wherein the wireless communication device maintains the first connection using the first RAT and the second connection using the second RAT in parallel.

2. The method of claim 1, wherein the second RAT is a Long Term Evolution (LTE) RAT, LTE-Advanced RAT, a Universal Mobile Telecommunications System (UMTS) RAT, or a Code Division Multiple Access 2000 (CDMA2000) RAT.

3. The method of claim 1, wherein:

comparing the measured connection quality metric to the threshold connection quality metric comprises the connection manager operating under control of a processor implemented on the wireless communication device comparing the measured connection quality metric to the threshold connection quality metric; and switching the data communication for the application from the first connection using the first RAT to the second connection using the second RAT comprises the connection manager instructing the radio interface layer, configured to control operation of one or more transceivers of the wireless communication device, to switch the data communication for the application from the first connection using the first RAT to the second connection using the second RAT.

4. The method of claim 3, wherein measuring the connection quality metric of the first connection using the first RAT comprises the radio interface layer measuring the connection quality metric of the first connection using the first RAT and making the measured connection quality metric available to the connection manager.

5. The method of claim 1, wherein the threshold connection quality metric has a predefined association with the activity being performed by the application.

6. The method of claim 5, further comprising the wireless communication device:

determining, after switching the data communication for the application from the first connection using the first RAT to the second connection using the second RAT, that the activity being performed by the application has been completed;

switching the data communication for the application from the second connection using the second RAT back to the first connection using the first RAT; and subsequently continuing the data communication for the application over the first connection using the first RAT in response to completion of the activity.

7. The method of claim 1, wherein the threshold connection quality metric defines a threshold packet error rate and an associated threshold number of packets that are sent for the application prior to calculation of a packet error rate and enforcement of the threshold packet error rate, and wherein measuring the connection quality metric of the first connection using the first RAT and comparing the measured connection quality metric to the threshold connection quality metric comprise calculating the packet error rate for the first connection using the first RAT and comparing the calculated packet error rate to the threshold packet error rate after the threshold number of packets have been sent for the application on the first connection using the first RAT.

8. The method of claim 1, wherein the threshold connection quality metric comprises one or more of a threshold throughput, a threshold timeout value, a threshold latency, or a threshold jitter value.

9. The method of claim 1, wherein determining the threshold connection quality metric comprises determining the threshold connection quality metric based at least in part on a cost to send data over the second connection using the second RAT.

10. A wireless communication device comprising:
at least one transceiver configurable to transmit data to and receive data from one or more wireless networks via a first radio access technology (RAT) and a second RAT; and
processing circuitry communicatively coupled to the at least one transceiver, the processing circuitry configured to control the wireless communication device to at least:
engage in data communication for an application over a first connection using the first RAT;
obtain, from an application layer by a connection manager between the application layer and a radio interface layer, indications of: (i) the application, (ii) an activity being performed by the application, the activity being one of a plurality of activities for the application, and (iii) a priority for the activity;
determine, by the connection manager, a threshold connection quality metric for the application, the threshold connection quality metric beingbased at least in part on the activity being performed by the application and on the priority for the corresponding activity, wherein each of the plurality of activities for the application is associated with a distinct threshold connection quality metric, and threshold connection quality metrics for activities having higher priorities cause switching between RATs more readily than threshold connection quality metrics for activities having lower priorities;
measure a connection quality metric of the first connection using the first RAT based at least in part on the data communication for the application over the first connection using the first RAT;
compare the measured connection quality metric to the threshold connection quality metric; and
in an instance in which the measured connection quality metric does not satisfy the threshold connection quality metric:
switch the data communication for the application from the first connection using the first RAT to a second connection using the second RAT; and
continue the data communication for the application over the second connection using the second RAT,
wherein the wireless communication device maintains the first connection using the first RAT and the second connection using the second RAT in parallel.

11. The wireless communication device of claim 10, wherein the first RAT is a wireless local area network (WLAN) RAT, and wherein the second RAT is a cellular RAT.

12. The wireless communication device of claim 10, wherein the processing circuitry is configured to further control the wireless communication device to:
compare the measured connection quality metric to the threshold connection quality metric at least in part by controlling the connection manager to compare the measured connection quality metric to the threshold connection quality metric; and
switch the data communication for the application from the first connection using the first RAT to the second connection using the second RAT at least in part by controlling the connection manager to instruct the radio interface layer, configured to control operation of the at least one transceiver of the wireless communication device, to switch the data communication for the application from the first connection using the first RAT to the second connection using the second RAT.

13. The wireless communication device of claim 12, wherein the processing circuitry is configured to further control the wireless communication device to measure the connection quality metric of the first connection using the first RAT at least in part by controlling the radio interface layer to measure the connection quality metric of the first connection using the first RAT and to make the measured connection quality metric available to the connection manager.

14. The wireless communication device of claim 10, wherein the determined threshold connection quality metric has a predefined association with the activity being performed by the application.

15. The wireless communication device of claim 14, wherein the processing circuitry is configured to further control the wireless communication device to: determine, after switching the data communication for the application from the first connection using the first RAT to the second connection using the second RAT, that the activity being performed by the application has been completed;
switch the data communication for the application from the second connection using the second RAT back to the first connection using the first RAT; and
subsequently continue the data communication for the application over the first connection using the first RAT in response to completion of the activity.

16. The wireless communication device of claim 10, wherein the threshold connection quality metric defines a threshold packet error rate and an associated threshold number of packets that are sent for the application prior to calculation of a packet error rate and enforcement of the threshold packet error rate, and
wherein the processing circuitry is configured to further control the wireless communication device to measure the connection quality metric of the first connection using the first RAT and compare the measured connection quality metric to the threshold connection quality metric at least in part by calculating the packet error rate for the first connection using the first RAT and comparing the calculated packet error rate to the threshold packet error rate after the threshold number of packets have been sent for the application on the first connection using the first RAT.

17. A computer program product comprising at least one non-transitory computer readable storage medium having computer program code stored thereon, the computer program code comprising instructions, that when executed by one or more processors of a wireless communication device configurable to connect wirelessly using a plurality of radio access technologies (RATs) to one or more wireless networks, cause the wireless communication device to:
    engage in data communication for an application over a first connection using a first radio access technology (RAT);
    obtain, from an application layer by a connection manager between the application layer and a radio interface layer, indications of: (i) the application, (ii) an activity being performed by the application, the activity being one of a plurality of activities for the application, and (iii) a priority for the activity;
    determine, by the connection manager, a threshold connection quality metric for the application, the threshold connection quality metric being based at least in part on the activity being performed by the application and on the priority for the corresponding activity, wherein each of the plurality of activities for the application is associated with a distinct threshold connection quality metric, and threshold connection quality metrics for activities having higher priorities cause switching between RATs more readily than threshold connection quality metrics for activities having lower priorities;
    measure a connection quality metric of the first connection using the first RAT based at least in part on the data communication for the application over the first connection using the first RAT;
    compare the measured connection quality metric to the threshold connection quality metric; and
        in an instance in which the measured connection quality metric does not satisfy the threshold connection quality metric:
            switch the data communication for the application from the first connection using the first RAT to a second connection using a second RAT; and
            continue the data communication for the application over the second connection using the second RAT, wherein the wireless communication device maintains the first connection using the first RAT and the second connection using the second RAT in parallel.

18. The computer program product of claim 17, wherein the first RAT is a wireless local area network (WLAN) RAT, and wherein the second RAT is a cellular RAT.

19. The computer program product of claim 17, wherein the wireless communication device:
    determines, after switching the data communication for the application from the first connection using the first RAT to the second connection using the second RAT, that the activity being performed by the application has been completed;
    switches the data communication for the application from the second connection using the second RAT back to the first connection using the first RAT; and
    subsequently continues the data communication for the application over the first connection using the first RAT in response to completion of the activity.

20. The computer program product of claim 17, wherein the threshold connection quality metric defines a threshold packet error rate and an associated threshold number of packets that are sent for the application prior to calculation of a packet error rate and enforcement of the threshold packet error rate;
    wherein the wireless communication device measures the connection quality metric of the first connection using the first RAT by calculating the packet error rate for the first connection using the first RAT after the threshold number of packets have been sent for the application on the first connection using the first RAT; and
    wherein the wireless communication device compares the measured connection quality metric to the threshold connection quality metric by comparing the calculated packet error rate to the threshold packet error rate after the threshold number of packets have been sent for the application on the first connection using the first RAT.

21. The computer program product of claim 17, wherein the wireless communication device determines the threshold connection quality metric by determining the threshold connection quality metric based at least in part on a cost to send data over the second connection using the second RAT.

22. A method for application-based access network switching performed at a wireless communication device configurable to connect wirelessly to a plurality of access networks, the method comprising the wireless communication device:
    engaging in data communication for an application over a first connection to a first access network;
    obtaining, from an application layer by a connection manager between the application layer and a radio interface layer, indications of: (i) the application, (ii) an activity being performed by the application, the activity being one of a plurality of activities for the application, and (iii) a priority for the activity;
    determining, by the connection manager, a threshold connection quality metric for the application, the threshold connection quality metric being based at least in part on the activity being performed by the application, wherein each of the plurality of activities for the application is associated with a distinct threshold connection quality metric, and threshold connection quality metrics for activities having higher priorities cause switching between access networks more readily than threshold connection quality metrics for activities having lower priorities;
    measuring a connection quality metric of the first connection to the first access network based at least in part on the data communication for the application over the first connection to the first access network;
    comparing, by a processor of the wireless communication device, a measured connection quality metric to the threshold connection quality metric; and
    in an instance in which the measured connection quality metric does not satisfy the threshold connection quality metric:
        switching the data communication for the application from the first connection to the first access network to a second connection to a second access network; and
        continuing the data communication for the application over the second connection to the second access network,
    wherein the wireless communication device maintains the first connection to the first access network and the second connection to the second access network in parallel.

23. The method of claim 22, wherein the first access network uses a first radio access technology (RAT), and the second access network uses a second RAT.

24. The method of claim 22, wherein the first access network and the second access network use a common radio access technology (RAT).

25. The method of claim 24, wherein the first access network and the second access network are wireless local area networks.

* * * * *